United States Patent
Lablanc et al.

(10) Patent No.: US 10,407,610 B2
(45) Date of Patent: Sep. 10, 2019

(54) METHODS AND SYSTEMS FOR SUPPRESSING CORROSION OF STEEL SURFACES

(71) Applicant: Halliburton Energy Services, Inc., Houston, TX (US)

(72) Inventors: Alyssa Lynn Lablanc, Humble, TX (US); Enrique Antonio Reyes, Tomball, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 207 days.

(21) Appl. No.: 15/519,535

(22) PCT Filed: Aug. 31, 2015

(86) PCT No.: PCT/US2015/047680
§ 371 (c)(1),
(2) Date: Apr. 14, 2017

(87) PCT Pub. No.: WO2016/089459
PCT Pub. Date: Jun. 9, 2016

(65) Prior Publication Data
US 2017/0240797 A1  Aug. 24, 2017

Related U.S. Application Data

(63) Continuation-in-part of application No. PCT/US2014/068370, filed on Dec. 3, 2014.

(51) Int. Cl.
*C09K 8/54* (2006.01)
*E21B 41/02* (2006.01)
(Continued)

(52) U.S. Cl.
CPC ............... *C09K 8/54* (2013.01); *C09K 8/035* (2013.01); *C09K 8/528* (2013.01); *C09K 8/56* (2013.01);
(Continued)

(58) Field of Classification Search
CPC ........ C09K 8/54; C09K 2208/32; C09K 8/74; E21B 41/02; E21B 43/25; E21B 17/01; E21B 37/06
See application file for complete search history.

(56) References Cited

U.S. PATENT DOCUMENTS 3,222,289 A   12/1965   Clark et al.
5,019,343 A   5/1991    Hwa et al.
(Continued)

FOREIGN PATENT DOCUMENTS

EP   0534621 A1   3/1993
EP   1163969 B1   12/2005
(Continued)

OTHER PUBLICATIONS

Aboud, Ricardo Salomao et al. "Effective Matrix Acidizing in High-Temperature Environments." SPE Annual Technical Conference and Exhibition, Society of Petroleum Engineers, 2007.
(Continued)

*Primary Examiner* — Zakiya W Bates
(74) *Attorney, Agent, or Firm* — Thomas Rooney; C. Tumey Law Group PLLC (57) ABSTRACT

Certain metal surfaces are often unable to be contacted effectively with fluids containing hydrofluoric acid due to significant corrosion issues. Steel surfaces represent but one example. Corrosion inhibitor compositions comprising an N-(phosphonoalkyl)iminodiacetic acid or any salt thereof can be used to suppress corrosion of steel surfaces, including those that contain multiple types or grades of steel. Methods (Continued)

for suppressing corrosion of a steel surface can comprise: contacting a steel surface with a corrosive environment, the corrosive environment comprising hydrofluoric acid; exposing the steel surface to a corrosion inhibitor composition, the corrosion inhibitor composition comprising an N-(phosphonoalkyl)iminodiacetic acid or any salt thereof; and suppressing corrosion of the steel surface being contacted with the corrosive environment through exposure to the corrosion inhibitor composition.

22 Claims, 2 Drawing Sheets

(51) Int. Cl.
    *C09K 8/74*     (2006.01)
    *C23F 11/04*     (2006.01)
    *C23F 11/167*     (2006.01)
    *C09K 8/035*     (2006.01)
    *C09K 8/528*     (2006.01)
    *C09K 8/56*     (2006.01)
    *C09K 8/62*     (2006.01)
    *E21B 37/06*     (2006.01)
    *E21B 43/25*     (2006.01)
    *E21B 17/01*     (2006.01)

(52) U.S. Cl.
    CPC ................ *C09K 8/62* (2013.01); *C09K 8/74* (2013.01); *C23F 11/04* (2013.01); *C23F 11/1676* (2013.01); *E21B 41/02* (2013.01); *C09K 2208/32* (2013.01); *E21B 17/01* (2013.01); *E21B 37/06* (2013.01); *E21B 43/25* (2013.01)

(56) References Cited

U.S. PATENT DOCUMENTS

| | | |
|---|---|---|
| 5,051,197 A | 9/1991 | Kalfayan et al. |
| 5,120,471 A | 6/1992 | Jasinski et al. |
| 5,171,460 A | 12/1992 | Underdown |
| 5,294,371 A | 3/1994 | Clubley et al. |
| 5,529,125 A | 6/1996 | Di Lullo Arias et al. |
| 5,543,388 A | 8/1996 | Williams et al. |
| 6,001,186 A | 12/1999 | Johnson et al. |
| 6,117,364 A | 9/2000 | Vorderbruggen et al. |
| 6,506,711 B1 | 1/2003 | Shughart et al. |
| 7,192,908 B2 | 3/2007 | Frenier et al. |
| 7,915,205 B2 | 3/2011 | Smith et al. |
| 7,994,102 B2 * | 8/2011 | Gupta .............. C09K 8/74 166/305.1 |
| 2004/0254079 A1 | 12/2004 | Frenier et al. |
| 2005/0016731 A1 | 1/2005 | Rae et al. |
| 2006/0054325 A1 | 3/2006 | Brown et al. |
| 2006/0131022 A1 | 6/2006 | Rae et al. |
| 2006/0219661 A1 | 10/2006 | Towse et al. |
| 2006/0281636 A1 | 12/2006 | Smith et al. |
| 2007/0071887 A1 | 3/2007 | Cassidy et al. |
| 2007/0235189 A1 | 10/2007 | Milne et al. |
| 2008/0006409 A1 | 1/2008 | Brown et al. |
| 2008/0200354 A1 | 8/2008 | Jones et al. |
| 2008/0280046 A1 | 11/2008 | Bryden et al. |
| 2009/0042748 A1 | 2/2009 | Fuller |
| 2011/0028360 A1 | 2/2011 | Jenkins |
| 2011/0190173 A1 | 8/2011 | Cassidy et al. |
| 2011/0286802 A1 | 11/2011 | Persson et al. |
| 2012/0115759 A1 | 5/2012 | Reyes |
| 2012/0128530 A1 | 5/2012 | Jenkins et al. |
| 2013/0079260 A1 | 3/2013 | Frenier et al. |
| 2013/0269946 A1 | 10/2013 | Dziekonski |
| 2013/0269947 A1 | 10/2013 | Shilling et al. |
| 2014/0119984 A1 | 5/2014 | Belakshe et al. |
| 2015/0005216 A1 | 1/2015 | De Wolf et al. |
| 2017/0298265 A1 | 10/2017 | Smith et al. |

FOREIGN PATENT DOCUMENTS

| | | |
|---|---|---|
| GB | 2404211 A | 1/2005 |
| GB | 2453630 A | 4/2009 |
| WO | 2008077005 A1 | 6/2008 |
| WO | 2009121893 A1 | 10/2009 |
| WO | 2016089391 A1 | 6/2016 |
| WO | 2016089394 A1 | 6/2016 |
| WO | 2016089459 A1 | 6/2016 |

OTHER PUBLICATIONS

Baxter, Carl F. et al. "Experience and Guidance in the Use of Titanium Components in Steel Catenary Riser Systems." OTC 18624, in Offshore Technology Conference, Offshore Technology Conference, Apr. 30-May 3, 2007 (13 pages).

"Corrosion Resistant Alloys for Deep Offshore Drilling by High Density Infrared Fusion Process", T1S4O2 Paper. Retrieved from URL: http://pennwell.sds06.websds.net/2013/dot/papers/T1S4O2-paper.pdf on Apr. 12, 2017 (19 pages).

Denney, Dennis. "Ultradeep HP/HT Completions: Classification, Design Methodologies, and Technical Challenges", J. Petroleum Technologies, pp. 83-85, Mar. 2007.

Gomez, Julio, et al. "Acid Stimulation of Geothermal Wells in Central America", SPE 121300, Society of Petroleum Engineers, SPE Latin American and Caribbean Petroleum Engineering Conference, May 31-Jun. 3, 2009 (10 pages).

Hill, Donald G. et al. "Reduction of Risk to the Marine Environment From Oilfield Chemicals û Environmentally Improved Acid Corrosion Inhibition for Well Stimulation." In Corrosion 2000. NACE International, 2000.

Hua, Fred et al. "Corrosion of Ti Gr 7 and other Titanium Alloys in Nuclear Waste Repository Environments—A Review", Corrosion 2004, Paper No. 04689, NACE International, 2004 (43 pages).

Jaramillo, O.J., et al. "Matrix Acid Systems for Formations With High Clay Content", SPE 126719, Society of Petroleum Engineers, SPE International Symposium and Exhibition on Formation Damage Control, Feb. 10-12, 2010 (15 pages).

Ke, Mingjie et al. "Corrosion behavior of various 13 chromium tubulars in acid stimulation fluids," SPE International Symposium on Oilfield Corrosion, Society of Petroleum Engineers, 2004.

Kong, De-Sheng. "Anion-Incorporation Model Proposed for Interpreting the Interfacial Physical Origin of the Faradaic Pseudocapacitance Observed on Anodized Valve Metals;with Anodized Titanium in Fluoride-Containing Perchloric Acid as an Example", Langmuir Article, vol. 26, No. 7, pp. 4880-4891, American Chemical Society, 2010.

Mahajan, M. et al. "Successes Achieved in Acidizing of Geothermal Wells in Indonesia", SPE 100996, Society of Petroleum Engineers, SPE Asia Pacific Oil & Gas Conference, Sep. 11-13, 2006 (10 pages).

Mainier, Fernando B. et al. "Evaluation of titanium in hydrochloric acid solutions containing corrosion inhibitors" IOSR Journal of Mechanical and Civil Engineering, vol. 10, issue 1, pp. 66-69, Nov.-Dec. 2013.

Nasr-El-Din, Hisham A. et al. "Investigation of a new single-stage sandstone acidizing fluid for high temperature formations." European Formation Damage Conference, Society of Petroleum Engineers, 2007.

Rosalbino, F. et al. "Influence of noble metals alloying additions on the corrosion behaviour of titanium in a fluoride-containing environment", Journal of Materials Science: Materials in Medicine, vol. 23, Issue 5, pp. 1129-1137, May 2012.

Seth, Kushal et al. "Development and Testing of a Novel Corrosion Inhibitor Technology for Acid Corrosion." SPE Middle East Oil and Gas Show and Conference, Society of Petroleum Engineers, 2011.

Sutter, E. M. M., et al. "The Behaviour of Titanium in Nitric-hydrofluoric Acid Solutions", Corrosion Science, vol. 30, No. 4/5, pp. 461-476, 1990.

International Search Report and Written Opinion dated Aug. 3, 2015 in PCT Application No. PCT/US2014/068390 (16 pages).

(56) References Cited

OTHER PUBLICATIONS

International Search Report and Written Opinion dated Aug. 3, 2015 in PCT Application No. PCT/US2014/068370 (14 pages).
International Search Report and Written Opinion dated Dec. 8, 2015 in PCT Application No. PCT/US2015/047680 (11 pages).
G. Mohammed, and A. Galadima. The Chemistry Scale inhibitors and the Mechanism of Interactions with Carbonate Reservoir Rock. (Year: 2011).
CTNF Office Action, for U.S. Appl. No. 15/519,536, dated Apr. 5, 2019.

* cited by examiner

METHODS AND SYSTEMS FOR SUPPRESSING CORROSION OF STEEL SURFACES

CROSS-REFERENCE TO RELATED APPLICATIONS

The present application is a continuation-in-part of International Patent Application PCT/US14/68370, filed on Dec. 3, 2014.

BACKGROUND

The present disclosure generally relates to corrosion and, more specifically, to methods for suppressing corrosion of steel surfaces during subterranean treatment operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Corrosive environments comprising an acid can cause severe corrosion damage to many types of metal surfaces. As used herein, the term "corrosion" and grammatical variants thereof will refer to any reaction between a metal surface and its surrounding environment that causes a deterioration or change in the metal surface's properties or morphology. Examples of corrosion damage to a metal surface can include, but are not limited to, rusting, metal dissolution or erosion, pitting, peeling, blistering, patina formation, cracking, embrittlement, and any combination thereof.

Acidic treatment fluids are frequently utilized in the course of conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material such as a carbonate material, mineral acids such as hydrochloric acid may often be sufficient to affect dissolution. Organic acids may be used in a similar manner to hydrochloric acid when dissolving a non-siliceous material. Siliceous materials, in contrast, are only readily dissolvable using hydrofluoric acid, optionally in combination with other acids. Illustrative siliceous materials can include, for example, silica, silicates, aluminosilicates, and any combination thereof, optionally in further combination with a non-siliceous material, such as a carbonate material.

Corrosion of metal surfaces within a wellbore penetrating a subterranean formation, such as tubulars and tools, for example, can be highly undesirable due to the difficulty, cost and production downtime associated with replacing or repairing such components. In many instances, elevated temperatures within subterranean formations can dramatically accelerate downhole corrosion rates. Localized temperature variations can also dramatically alter the rate at which corrosion takes place in a particular position within the wellbore.

Metal surfaces in fluid communication with a wellbore can similarly be susceptible to corrosion and its undesirable effects. In subsea wellbores, for example, a subsea riser structure extending from the wellbore to a platform or vessel on the ocean's surface or just below the ocean's surface can be susceptible to corrosion, in spite of the low temperatures of deepwater environments. Outside the wellbore, corrosion can occur during introduction of a treatment fluid to the wellbore, during production, or any combination thereof. Regardless of its location, corrosion-induced damage of a metal surface can represent a significant safety and/or environmental concern due to potential well failure issues.

Although acids may represent a potential corrosion threat to assorted metal surfaces, hydrofluoric acid can be especially problematic and damaging toward many metals due to its high reactivity. Various types or grades of steel represent illustrative metal surfaces that are particularly sensitive toward hydrofluoric acid. Most steel types are prone to corrosion in the presence of even modest quantities of hydrofluoric acid at pH values of about 7 or less, although the corrosion rates may vary significantly from type to type. The sensitivity of steel toward hydrofluoric acid can preclude use of this metal in situations where acidizing of a siliceous material is anticipated to take place. For example, the presence of steel within at least a portion of a subsea riser structure can preclude transport of hydrofluoric acid to or from a deepwater wellbore. Due to the propensity of steel surfaces toward corrosion by hydrofluoric acid, it can be especially difficult to conduct stimulation operations in deepwater wellbores containing a siliceous material.

In some instances, corrosion inhibitors can be used to reduce the propensity of a metal surface to undergo corrosion-induced damage by acids. As used herein, the terms "inhibit," "inhibitor," "inhibition" and other grammatical forms thereof will generally refer to the lessening of the tendency of a phenomenon to occur and/or the degree to which that phenomenon occurs. The terms "suppress," "suppression" and other grammatical forms thereof may be used equivalently herein. The term "inhibit" and equivalents thereof do not imply any particular extent or amount of inhibition or suppression unless otherwise specified herein. Although the corrosiveness of hydrochloric acid toward steel can usually be effectively suppressed using a variety of common corrosion inhibitors, such corrosion inhibitors are often much less effective for inhibiting the corrosiveness of hydrofluoric acid. Moreover, due to the variance of corrosion rates for different types of steel and also factoring in the local conditions where the steel is present, it can be difficult to suppress corrosion using a single corrosion inhibitor that is effective over a range of conditions and metallurgies.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to corrosion and, more specifically, to methods for suppressing corrosion of steel surfaces during subterranean treatment operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, corrosion of metal surfaces can be detrimental for a number of reasons. It can be very difficult, in particular, to mitigate corrosion induced by hydrofluoric acid at concentrations that are effective for conducting various subterranean treatment operations, such as matrix acidizing or scale removal. In this regard, various types of steel surfaces can experience excessive corrosion in the presence of hydrofluoric acid, with the corrosion rate often varying considerably for different types of steels and depending upon the localized conditions to which the steel surface is exposed.

The present inventors discovered that various N-(phosphonoalkyl)iminodiacetic acids or any salt thereof can promote corrosion inhibition of metal surfaces by hydrofluoric acid, even for sensitive metals such as various steel types. An illustrative example of an N-(phosphonoalkyl) iminodiacetic acid that can be used in the embodiments of the present disclosure is N-(phosphonomethyl)iminodiacetic acid (PMIDA). The corrosion inhibiting effects of PMIDA and other N-(phosphonoalkyl)iminodiacetic acids can be especially pronounced when used in combination with an organic corrosion inhibitor, although some corrosion inhibition effects may be realized even without a conventional corrosion inhibitor being present. Boric acid or compounds capable of releasing boric acid may similarly enhance the corrosion inhibiting effects of the PMIDA and other N-(phosphonoalkyl)iminodiacetic acids. While conventional corrosion inhibitors alone may be ineffective for suppressing hydrofluoric acid-induced corrosion of steel surfaces, the combination of PMIDA and a conventional corrosion inhibitor can be particularly effective for suppressing such corrosion. Advantageously, various types of steel surfaces may be effectively protected by a corrosion inhibitor composition comprising PMIDA or a related compound without significantly tailoring the corrosion inhibitor composition toward the chemistry of a particular type of steel or localized conditions of a given corrosive environment. Accordingly, various types of steel surfaces may be contacted with hydrofluoric acid for an operationally significant amount of time without excessive corrosion occurring when PMIDA or a related compound and a conventional corrosion inhibitor are present together with one another.

More particularly, the present inventors discovered that the corrosiveness of relatively high concentrations of hydrofluoric acid (e.g., about 0.1 M to about 5 M, particularly about 0.25 M to about 5 M) may be effectively suppressed using comparable concentrations of PMIDA or other N-(phosphonoalkyl)iminodiacetic acids. Advantageously, the corrosion suppression promoted by PMIDA or related compounds is not believed to significantly impact hydrofluoric acid's reactivity toward dissolving siliceous materials. Thus, inhibiting the corrosiveness of hydrofluoric acid through using PMIDA or other N-(phosphonoalkyl)iminodiacetic acids can advantageously allow various subterranean treatment operations still to take place. Without using PMIDA or related compounds to suppress corrosion, hydrofluoric acid-based treatment operations may not otherwise be performable, at least without risking significant corrosion of various steel surfaces in fluid communication with a wellbore. For large metal assemblies, such as subsea riser structures extending hundreds to thousands of feet below the water line, the potential for corrosion and ensuing loss of containment may represent an unacceptable economic and safety barrier for downhole treatment operations to take place.

By utilizing PMIDA or other N-(phosphonoalkyl)iminodiacetic acids to suppress corrosion, various metal goods may be maintained in operational use for a longer period of time than would otherwise be possible before downtime to address corrosion damage. As used herein, the term "operational use" will refer to the in-process deployment condition of a metal surface. In oilfield operations and other process settings, decreased downtime can be highly advantageous for holding down operating costs. By utilizing PMIDA or related compounds to suppress corrosion, a steel surface may be contacted with hydrofluoric acid and maintained in operational use for extended periods of time. Without suppressing hydrofluoric acid-induced corrosion, replacement of the steel surface may otherwise need to take place much sooner, as corrosion damage can occur very rapidly in the presence of this acid.

PMIDA and other N-(phosphonoalkyl)iminodiacetic acids can present a number of other advantages when used in conjunction with inhibiting corrosion. PMIDA is a relatively inexpensive material. Moreover, PMIDA is believed to be environmentally benign, due at least in part to its propensity toward biodegradation. As used herein, the terms "biodegradation," "biodegradable" and related variants thereof will refer to a substance that can be broken down by exposure to environmental conditions including native or non-native microbes, sunlight, air, heat, and the like. No particular rate of biodegradation is implied by use of these terms unless otherwise specified herein. PMIDA advantageously possesses a sufficiently high chemical stability over the short term to suppress corrosion, but a short enough biodegradation lifetime to make it environmentally friendly for use in most locales. Still further, PMIDA has good thermal stability, allowing it to be used in high temperature subterranean formations, including those having a temperature above about 300° F. The combination of these advantageous properties make PMIDA well suited for deployment under a wide range of process conditions.

In various embodiments, methods described herein may comprise: contacting a steel surface with a corrosive environment, the corrosive environment comprising hydrofluoric acid; exposing the steel surface to a corrosion inhibitor composition, the corrosion inhibitor composition comprising an N-(phosphonoalkyl)iminodiacetic acid or any salt thereof; and suppressing corrosion of the steel surface being contacted with the corrosive environment through exposure to the corrosion inhibitor composition.

The corrosive environment contacting the steel surface generally comprises a fluid phase, such as a corrosive environment comprising a subterranean treatment fluid. Although the N-(phosphonoalkyl)iminodiacetic acid or any salt thereof may promote corrosion inhibition of a steel surface present within a wellbore or in fluid communication with a wellbore, it is to be recognized that the corrosion-inhibiting effects described herein may be realized in any type of in-process setting in which one or more grades of steel are present. For example, an N-(phosphonoalkyl)iminodiacetic acid or any salt thereof may be used for suppressing corrosion of a steel surface in a plant or process setting in which hydrofluoric acid is used. Illustrative process settings in which an N-(phosphonoalkyl)iminodiacetic acid or any salt thereof may be used to inhibit corrosion include, for example, manufacturing processes using hydrofluoric acid, storage and transport structures for hydrofluoric acid, and the like.

In more specific embodiments, the steel surface may contact the corrosive environment in the course of conducting a subterranean treatment operation. Accordingly, in such embodiments, the corrosive environment may comprise a treatment fluid and the corrosion inhibitor composition may be present in the treatment fluid. The corrosion inhibitor composition may be combined with the corrosive environment before the corrosive environment contacts the steel surface, such that the corrosion inhibitor composition is present in the corrosive environment when the corrosive environment begins contacting the steel surface. In alternative embodiments, the corrosion inhibitor composition may be exposed to the steel surface before the corrosion inhibitor composition is introduced to the corrosive environment. That is, when performing a treatment operation, a treatment fluid comprising the corrosion inhibitor composition can be introduced to a wellbore before a treatment fluid comprising hydrofluoric acid or a hydrofluoric acid-generating compound. In still other alternative embodiments, the corrosion inhibitor composition may be added to a treatment fluid after the treatment fluid has already begun contacting the steel surface. In some embodiments, the corrosion inhibitor composition may be added on-the-fly to a treatment fluid being introduced to a wellbore. In other embodiments, the corrosion inhibitor composition may be present in the treatment fluid before introduction of the treatment fluid to the wellbore begins.

The treatment fluids of the present disclosure may comprise an aqueous carrier fluid or an oleaginous carrier fluid as their continuous phase. In some embodiments, the treatment fluids of the present disclosure may be emulsified or foamed.

Suitable aqueous carrier fluids may include, for example, fresh water, acidified water, salt water, seawater, produced water, recycled water, ground water, flowback water, brackish water, brine (e.g., a saturated salt solution), or an aqueous salt solution (e.g., a non-saturated salt solution). Aqueous carrier fluids may be obtained from any suitable source.

In some embodiments, the aqueous carrier fluid may be chosen such that it is substantially free of alkali metal ions. For purposes of this disclosure, an aqueous carrier fluid or a treatment fluid formed therefrom will be considered to be substantially free of alkali metal ions if less than about 1 wt. % alkali metal ions are present. Choice of an aqueous carrier fluid that is substantially free of alkali metal ions may be desirable in order to limit re-precipitation of alkali metal silicates and fluorosilicates.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid.

In other various embodiments, the treatment fluids may comprise an oleaginous carrier fluid. Suitable oleaginous carrier fluids may include, for example, an organic solvent, a hydrocarbon, oil, a refined component of oil, or any combination thereof.

In some embodiments, the hydrofluoric acid present in the treatment fluids of the present disclosure may be formed from a hydrofluoric acid-generating compound. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides (e.g., $TiF_4$ and $TiF_6^{2-}$), boron trifluoride and various boron trifluoride complexes.

In some embodiments, an acid or an acid-generating compound may be present in combination with hydrofluoric acid or a hydrofluoric acid-generating compound. The acid or acid-generating compound and its amount may be chosen to adjust the protonation state and salt form of the N-(phosphonoalkyl)iminodiacetic acid and to mitigate pH changes in the treatment fluid as the hydrofluoric acid spends, for example.

Examples of acids suitable for use in combination with hydrofluoric acid or a hydrofluoric acid-generating compound may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly(orthoesters), poly(lactides), poly(glycolides), poly(s-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

The pH of the treatment fluid may be chosen such that the N-(phosphonoalkyl)iminodiacetic acid is initially fully protonated, or the pH may be chosen such that one or more of the acid groups of the N-(phosphonoalkyl)iminodiacetic acid is deprotonated. When fully protonated, the N-(phosphonoalkyl)iminodiacetic acid may initially be insufficient to promote complexation of a metal ion. However, as the treatment fluid spends and the pH rises, the N-(phosphonoalkyl)iminodiacetic acid may become at least partially deprotonated and active to affect complexation of a metal ion. Regardless of its initial status for complexing a metal ion, the N-(phosphonoalkyl)iminodiacetic acid may remain active for mitigating corrosion according to the description provided herein.

The N-(phosphonoalkyl)iminodiacetic acid may be used in the corrosion inhibitor composition in its neutral form or in any salt form. In some embodiments, the carboxylic acid or phosphonic acid groups of the N-(phosphonoalkyl)iminodiacetic acid may be in a salt form, particularly an ammonium or quaternary ammonium salt form. Use of an ammonium or quaternary ammonium salt form for the acid groups desirably avoids introducing alkali metal ions into the wellbore, which otherwise may promote re-precipitation of silica scale. The protonated form of the acid groups also desirably avoids introducing unwanted alkali metal ions into the wellbore. In other various embodiments, the amine group of the N-(phosphonoalkyl)iminodiacetic acid may be used in a salt form. The amine salt form may comprise a protonated salt form, such as a hydrochloride or formate salt form, or a quaternized salt form.

In various embodiments, the neutral form of the N-(phosphonoalkyl)iminodiacetic acid that is present in the corrosion inhibitor compositions of the present disclosure may have the structure shown in Formula 1 below Formula 1 wherein n is an integer ranging between 1 and about 5. A carbon chain length of this range may be beneficial for promoting aqueous solubility of the N-(phosphonoalkyl)iminodiacetic acid. In more specific embodiments, a particularly suitable N-(phosphonoalkyl)iminodiacetic acid for practicing the disclosure herein can be N-(phosphonomethyl)iminodiacetic acid, in which n is 1.

In the methods of the present disclosure, fairly high concentrations of both hydrofluoric acid and the N-(phosphonoalkyl)iminodiacetic acid or any salt thereof are present in the corrosive environment, such as in a treatment fluid. In various embodiments, a concentration of hydrofluoric acid in the treatment fluid may range between about 0.1 M and about 5 M or between about 0.25 M and about 5 M. These values may represent the hydrofluoric acid concentration in a treatment fluid or the generatable hydrofluoric acid concentration in a treatment fluid. Hydrofluoric acid concentrations in this range may be particularly effective for performing various subterranean treatment operations, such as descaling and matrix dissolution, for example.

The chosen concentration of the N-(phosphonoalkyl)iminodiacetic acid or any salt thereof may represent an effective amount to counterbalance the corrosive effects of the quantity of hydrofluoric acid that is present. In particular embodiments, a concentration of the N-(phosphonoalkyl)iminodiacetic acid or any salt thereof in the corrosive environment, such as a treatment fluid, may range between about 0.2 M and about 2 M. In more particular embodiments, a concentration of the N-(phosphonoalkyl)iminodiacetic acid or any salt thereof in the treatment fluid may range between about 0.5 M and about 0.8 M. Such high concentrations of the N-(phosphonoalkyl)iminodiacetic acid or any salt thereof may provide effective complexation of metal ions without another chelating agent being present.

In various embodiments of the present disclosure, the N-(phosphonoalkyl)iminodiacetic acid or any salt thereof may be present in a treatment fluid without other chelating agents being present. Accordingly, in addition to its role of protecting a steel surface from corrosion, the N-(phosphonoalkyl)iminodiacetic acid or any salt thereof may also serve a second role of complexing a metal ion in the corrosive environment. As used herein, the terms "complex," "complexing," "complexation" and other grammatical variants thereof will refer to the formation of a metal-ligand bond. Although complexation of a metal ion may involve a chelation process in some embodiments, complexation is not deemed to be limited in this manner. PMIDA effectively complexes a wide variety of metal ions with a range of stability constants. Table 1 below shows the stability constants at 20° C. of several metal ions complexed with PMIDA.

TABLE 1

| Metal Ion | $\text{Log}_{10}$ of Stability Constant |
|---|---|
| $Mg^{2+}$ | 6.28 |
| $Ca^{2+}$ | 7.18 |
| $Sr^{2+}$ | 5.59 |
| $Ba^{2+}$ | 5.35 |

Unlike some alkaline earth phosphonates, these complexes are advantageously soluble in low pH aqueous fluids (pH=0.5-5). The N-(phosphonoalkyl)iminodiacetic acid or any salt thereof may initially be in a salt form suitable for complexing a metal ion, or a salt form suitable for complexing a metal ion may form as the treatment fluid spends. Metal ions complexed by the N-(phosphonoalkyl)iminodiacetic acid or any salt thereof may arise from any source being contacted by the corrosive environment.

An organic corrosion inhibitor may be present in combination with the hydrofluoric acid and the N-(phosphonoalkyl)iminodiacetic acid or any salt thereof in the corrosive environment. That is, the corrosion inhibitor composition may further comprise an organic corrosion inhibitor, so as to enhance the exhibited corrosion inhibiting effects. The identity and amount of the organic corrosion inhibitor may vary in view of the amounts of hydrofluoric acid and the N-(phosphonoalkyl)iminodiacetic acid or any salt thereof that are present. In illustrative embodiments, a concentration of the organic corrosion inhibitor in the corrosive environment or treatment fluid may range between about 0.1 wt. % and about 5 wt. %. In more specific embodiments, a concentration of the organic corrosion inhibitor may range between about 0.5 wt. % and about 5 wt. %, or between about 1 wt. % and about 3 wt. %, or between about 2 wt. % and about 4 wt. %.

Illustrative organic corrosion inhibitors that may be present include compounds such as, for example, an acetylenic alcohol, a Mannich condensation product, an unsaturated carbonyl compound, an unsaturated ether, formamide or a reaction product thereof, a formate, an iodide, a terpene, an aromatic hydrocarbon, cinnamaldehyde or a derivative thereof, a fluorinated surfactant, a quaternary derivative of a heterocyclic nitrogen base, a quaternary derivative of a halomethylated aromatic compound, or any combination thereof. Other illustrative corrosion inhibitors may include, for example, a reaction product of an α,β-unsaturated aldehyde or ketone with a primary or secondary amine, and a reaction product of an aldehyde with a thiol and/or an amide. The reaction product may be pre-formed before placing it in a corrosive environment, such as a treatment fluid, or it may be formed in situ from the individual components within the corrosive environment. In illustrative embodiments, a suitable organic corrosion inhibitor may comprise MSA-III (a sulfur-containing organic acid corrosion inhibitor), HAI-404M (a quaternary ammonium corrosion inhibitor), or HAI-OS (an acetylenic alcohol corrosion inhibitor), each of which is available from Halliburton Energy Services.

Further optionally, a corrosion inhibitor intensifier may be present in the corrosion inhibitor compositions. Corrosion inhibitor intensifiers, sometimes referred to as activators, can function to activate another corrosion inhibitor. Corrosion inhibitor intensifiers that may be used in the embodiments of the present disclosure include quaternary ammonium compounds, copper compounds (e.g., cuprous iodide and cuprous chloride), antimony compounds (e.g., antimony oxides, antimony halides, antimony tartrate, antimony citrate, antimony tartrate, antimony citrate, pyroantimonate salts, and antimony adducts of ethylene glycol), bismuth compounds (e.g., bismuth oxides, bismuth halides, bismuth tartrate, and bismuth citrate), molybdate salts including hetero-polymolybdates, iodine, iodide compounds (e.g., potassium iodide and sodium iodide), formic acid, and any combination thereof. When present, a concentration of the corrosion inhibitor intensifier in the corrosive environment or treatment fluid may range from about 0.1 wt. % to about 8.0 wt. % or from about 0.1 wt. % to about 5 wt. %.

In some or other embodiments, boric acid may be present in the corrosion inhibitor composition or generated in the corrosion inhibitor composition. In various embodiments, a concentration of boric acid in the corrosive environment or treatment fluid may range between about 0.5 wt. % and about 14 wt. % or between about 2 wt. % and about 14 wt. %. The boric acid may be introduced directly to the corrosive environment and/or be generated therein from a boric acid precursor. In some embodiments, boric acid may be generated in the corrosive environment from borax and an acid such as hydrochloric acid. Other suitable boric acid precursors may include, for example, tetraborates (e.g., sodium tetraborate), tetrafluoroborates, metal borate ligand complexes (ligand=oxalic acid, citric acid, glycolic acid, lactic acid, tartaric acid, malic acid, maleic acid, and succinic acid), boronic acids, boronate esters, and organotrifluoroborates. Polymeric boric acid precursors, such as those containing an acrylamide monomer bonded to a boronic acid, may be used in a similar manner.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One of ordinary skill in the art will be able to formulate a treatment fluid having properties suitable for a given application.

In some embodiments, the steel surface being exposed to the corrosion inhibitor composition may be present in a wellbore into which a treatment fluid is being introduced. For example, steel surfaces in a wellbore that may be exposed to the corrosion inhibitor composition may comprise a portion of a tubular or a wellbore tool. In other various embodiments, the steel surface may not be present in the wellbore per se, but may instead represent a structure in fluid communication with the wellbore. For example, pipelines, subsea riser structures, mixing tanks and storage vessels outside the wellbore may also be contacted with the corrosion inhibitor composition according to some embodiments of the present disclosure in order to suppress corrosion in the presence of hydrofluoric acid.

A number of different types of steel alloys may be protected from hydrofluoric acid-induced corrosion by practicing the embodiments of the present disclosure. In this regard, carbon steels, chromium steels and higher grade steel alloys may each be protected from the effects of corrosion by the corrosion inhibitor compositions disclosed herein, although not necessarily all to the same degree. Illustrative chromium steels may have a chromium content that ranges between about 1% to about 40% by weight, or between about 5% to about 30% by weight. The chromium steel may be a stainless steel in some embodiments such as, for example, austenitic steels, superaustenitic steels, ferrite steels, martensitic steels, precipitation-hardening martensitic steels, and duplex steels containing a mixed microstructure of austenite and ferrite. Illustrative steel alloys that may be protected from corrosion according to various embodiments of the present disclosure include, for example, N-80, L-80, N-95, J-55, P-110, QT800, QT900, QT1000, HS80, HS90, 13Cr, 25Cr, Cr-13S, 13Cr-S110, INCOLOY 825, 316 L, F6NM, X65, 5LX-42, 5LX-52, P110 and the like. One having ordinary skill in the art will be familiar with these different types of steel alloys, their composition, and their general reactivity toward hydrofluoric acid.

In more specific embodiments, the steel surface being exposed to the corrosion inhibitor composition may comprise at least a portion of a subsea riser structure. In some embodiments, at least a portion of a subsea riser structure may comprise multiple types of steel alloys. That is, the steel surface may comprise more than one type of steel alloy. Accordingly, by contacting a subsea riser structure with a corrosion inhibitor composition of the present disclosure, corrosion resulting from conveyance of hydrofluoric acid to and/or from a wellbore may be suppressed, including configurations in which multiple steel alloys are present in a given steel surface. Steel surfaces comprising more than one type of steel alloy may be present in not only subsea riser structures, but also in other types of tools and conduits when varying mechanical or chemical properties are needed in different locations therein.

In some embodiments, methods of the present disclosure may further comprise introducing a treatment fluid containing the corrosion inhibitor composition into a wellbore penetrating a subterranean formation. The corrosion inhibitor composition may suppress corrosion of a steel surface present in the wellbore or in fluid communication with the wellbore.

Once within the wellbore, a treatment fluid containing the corrosion inhibitor composition may perform various functions, such as the treatment operations described above. In more particular embodiments, the treatment operation may comprise contacting the treatment fluid with a siliceous material in a subterranean formation penetrated by the wellbore, and at least partially dissolving the siliceous material with the treatment fluid. Dissolution may involve reacting the siliceous material with the hydrofluoric acid. Illustrative siliceous materials that may be contacted and dissolved with the hydrofluoric acid include, for example, silica, silicates, aluminosilicates, geothermal scale, the like, and any combination thereof. In various embodiments, dissolving geothermal scale may comprise dissolving at least a portion of the geothermal scale with the hydrofluoric acid to produce a metal ion, and complexing the metal ion with the N-(phosphonoalkyl)iminodiacetic acid. Complexation of the metal ion by the N-(phosphonoalkyl)iminodiacetic acid may substantially prevent re-precipitation of an insoluble form of the metal ion.

In some embodiments, methods described herein may comprise: providing a treatment fluid comprising: hydrofluoric acid or a hydrofluoric acid-generating compound, and a corrosion inhibitor composition comprising an N-(phosphonoalkyl)iminodiacetic acid or any salt thereof; introducing the treatment fluid into a wellbore penetrating a subterranean formation; and contacting the treatment fluid with a steel surface present in the wellbore or in fluid communication with the wellbore. In further embodiments, the methods may further comprise performing a treatment operation in the wellbore, such as by at least partially dissolving a siliceous material that may be present in the wellbore or in the subterranean formation.

In more specific embodiments, methods of the present disclosure may comprise: providing a steel surface in a wellbore or in fluid communication with a wellbore; contacting the steel surface with a treatment fluid comprising hydrofluoric acid or a hydrofluoric acid-generating compound and a corrosion inhibitor composition comprising an N-(phosphonoalkyl)iminodiacetic acid or any salt thereof; wherein a concentration of hydrofluoric acid or generatable hydrofluoric acid in the treatment fluid ranges between about 0.25 M and about 5 M and wherein a concentration of the N-(phosphonoalkyl)iminodiacetic acid or any salt thereof in the treatment fluid ranges between about 0.2 M and about 2 M; and maintaining the steel surface in operational use after contacting the treatment fluid with the steel surface.

In some embodiments, the steel surface may remain in operational use for at least about 1 hour after contacting the treatment fluid. In other various embodiments, the steel surface may remain in operational use for at least about 2 hours, or at least about 4 hours, or at least about 6 hours, or at least about 12 hours, or at least about 24 hours after contacting the treatment fluid. Corrosion of the steel surface may occur may occur much more rapidly when the N-(phosphonoalkyl)iminodiacetic acid or any salt thereof is not used, thereby providing a decreased period of operational use.

In other various embodiments, systems configured for delivering a treatment fluid of the present disclosure to a downhole location are described herein. In various embodiments, the systems can comprise a pump fluidly coupled to a tubular, the tubular containing a treatment fluid comprising hydrofluoric acid or a hydrofluoric acid-generating compound and a corrosion inhibitor composition comprising an N-(phosphonoalkyl)iminodiacetic acid or any salt thereof; wherein the tubular comprises a steel surface or is fluid communication with a steel surface.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the corrosion inhibitor composition is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
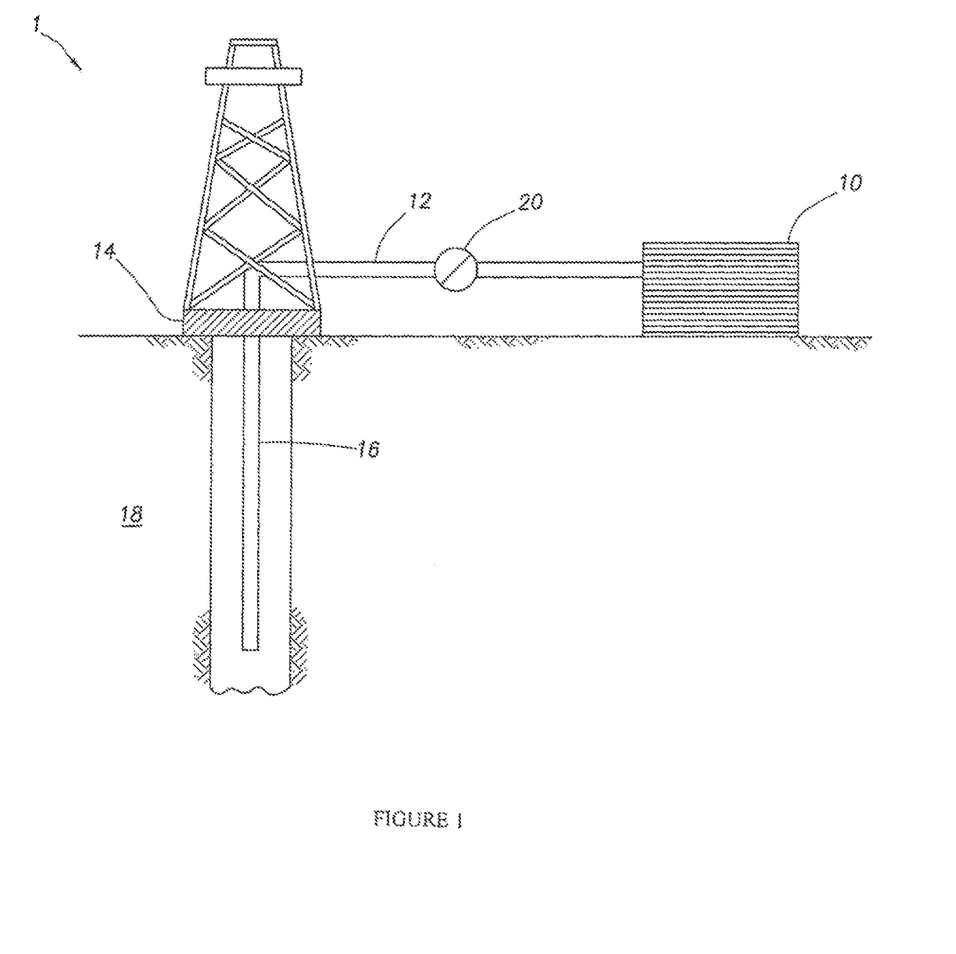
FIG. 1 shows an illustrative schematic of a system that can deliver treatment fluids of the present disclosure to a downhole location, according to one or more embodiments.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. For example, the treatment fluid may be delivered to the downhole location of a subsea wellbore using a subsea riser structure, such as a subsea riser containing a steel alloy within a steel surface. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
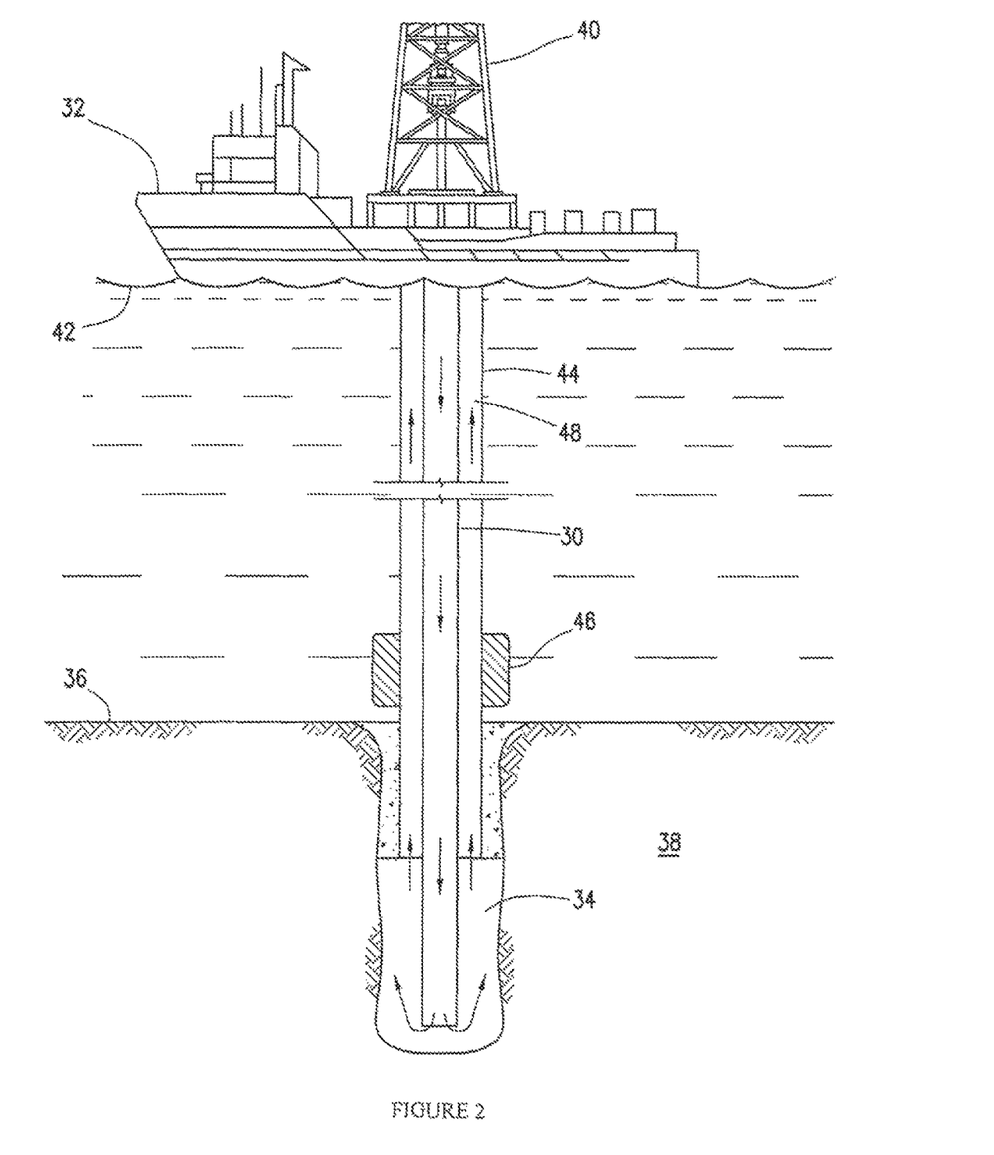
FIG. 2 shows an illustrative schematic of a subsea riser structure in fluid communication with a wellbore.

FIG. 2 shows an illustrative schematic of a subsea riser structure in fluid communication with a wellbore. As shown in FIG. 2, tubular 30 extends from platform or ship 32 into wellbore 34, which extends below seabed 36 and penetrates subterranean formation 38. Tubular 30 may be similar to that shown in system 1 of FIG. 1 and may be better understood by reference thereto. Rig 40 resides upon platform or ship 32 above waterline 42. Subsea riser structure 44 extends between platform or ship 32 and wellbore 34, spanning at least the distance between waterline 42 and seabed 36 and also passing through blowout preventer 46. Tubular 30 resides within subsea riser structure 44, and annular space 48 is defined therebetween.

A treatment fluid comprising hydrofluoric acid or a hydrofluoric acid-generating compound and an N-(phosphonoalkyl)iminodiacetic acid or any salt thereof may be introduced to wellbore 34 through tubular 30, subsea riser structure 44 or a secondary conduit (not depicted). The N-(phosphonoalkyl)iminodiacetic acid may aid in suppressing corrosion of various steel surfaces within these structures. Similarly, upon producing the spent or partially spent treatment fluid from wellbore 34, the N-(phosphonoalkyl) iminodiacetic acid may aid in suppressing corrosion of the various steel surfaces upon flowback.

Embodiments disclosed herein include:

A. Methods for suppressing corrosion. The methods comprise: contacting a steel surface with a corrosive environment, the corrosive environment comprising hydrofluoric acid; exposing the steel surface to a corrosion inhibitor composition, the corrosion inhibitor composition comprising an N-(phosphonoalkyl)iminodiacetic acid or any salt thereof; and suppressing corrosion of the steel surface being contacted with the corrosive environment through exposure to the corrosion inhibitor composition.

B. Methods for suppressing corrosion. The methods comprise: providing a treatment fluid comprising: hydrofluoric acid or a hydrofluoric acid-generating compound, and a corrosion inhibitor composition comprising an N-(phosphonoalkyl)iminodiacetic acid or any salt thereof; introducing the treatment fluid into a wellbore penetrating a subterranean formation; and contacting the treatment fluid with a steel surface present in the wellbore or in fluid communication with the wellbore.

C. Methods for suppressing corrosion. The methods comprise: providing a steel surface in a wellbore or in fluid communication with a wellbore; contacting the steel surface with a treatment fluid comprising hydrofluoric acid or a hydrofluoric acid-generating compound and a corrosion inhibitor composition comprising an N-(phosphonoalkyl) iminodiacetic acid or any salt thereof; wherein a concentration of hydrofluoric acid or generatable hydrofluoric acid in the treatment fluid ranges between about 0.25 M and about 5 M and wherein a concentration of the N-(phosphonoalkyl) iminodiacetic acid or any salt thereof in the treatment fluid ranges between about 0.2 M and about 2 M; and maintaining the steel surface in operational use after contacting the treatment fluid with the steel surface.

D. Systems for introducing a corrosion inhibitor composition into a wellbore. The systems comprise: a pump fluidly coupled to a tubular, the tubular containing a treatment fluid comprising hydrofluoric acid or a hydrofluoric acid-generating compound and a corrosion inhibitor composition comprising an N-(phosphonoalkyl)iminodiacetic acid or any salt thereof; wherein the tubular comprises a steel surface or is in fluid communication with a steel surface.

Each of embodiments A-D may have one or more of the following additional elements in any combination:

Element 1: wherein the corrosion inhibitor composition is present in the corrosive environment when the corrosive environment contacts the steel surface.

Element 2: wherein the corrosive environment comprises a treatment fluid and the steel surface is present within a wellbore or is in fluid communication with a wellbore.

Element 3: wherein a concentration of hydrofluoric acid in the treatment fluid ranges between about 0.25 M and about 5 M.

Element 4: wherein a concentration of the N-(phosphonoalkyl)iminodiacetic acid or any salt thereof in the treatment fluid ranges between about 0.2 M and about 2 M.

Element 5: wherein the method further comprises: introducing the treatment fluid into the wellbore; contacting the treatment fluid with a siliceous material in a subterranean formation penetrated by the wellbore; and at least partially dissolving the siliceous material with the treatment fluid.

Element 6: wherein the method further comprises: combining the corrosion inhibitor composition with the corrosive environment before the corrosive environment contacts the steel surface.

Element 7: wherein the N-(phosphonoalkyl)iminodiacetic acid has a structure of wherein n is an integer ranging between 1 and about 5.

Element 8: wherein the N-(phosphonoalkyl)iminodiacetic acid comprises N-(phosphonomethyl)iminodiacetic acid.

Element 9: wherein the corrosion inhibitor composition further comprises an organic corrosion inhibitor.

Element 10: wherein the steel surface comprises more than one type of steel alloy.

Element 11: wherein a concentration of hydrofluoric acid or generatable hydrofluoric acid in the treatment fluid ranges between about 0.25 M and about 5 M.

Element 12: wherein the method further comprises: contacting the treatment fluid with a siliceous material in the subterranean formation; and at least partially dissolving the siliceous material with the treatment fluid.

Element 13: wherein the steel surface comprises at least a portion of a subsea riser structure.

By way of non-limiting example, exemplary combinations applicable to A-D include:

The method of A in combination with elements 1 and 2.
The method of A in combination with elements 2 and 3.
The method of A in combination with elements 2 and 4.
The method of A in combination with elements 2-4.
The method of A in combination with elements 1-4.
The method of A in combination with elements 1 and 6.
The method of A in combination with elements 3 and 5.
The method of A in combination with elements 4 and 5.
The method of A in combination with elements 3, 4 and 9.
The method of A in combination with elements 9 and 10.
The method of A in combination with elements 10 and 13.
The method of B in combination with elements 11 and 12.
The method of B in combination with elements 8 and 10.
The method of B in combination with elements 3 and 8.
The method of B in combination with elements 4 and 11.
The method of B in combination with elements 9-11.
The method of B in combination with elements 10 and 12.
The method of C in combination with elements 5 and 13.
The method of C in combination with elements 9 and 10.
The system of D in combination with elements 8 and 9.
The system of D in combination with elements 3 and 4.
The system of D in combination with elements 9 and 10.

To facilitate a better understanding of the embodiments of the present disclosure, the following examples of preferred or representative embodiments are given. In no way should the following examples be read to limit, or to define, the scope of the disclosure.

EXAMPLES

Example 1

In a typical procedure, 1.5"×2"×0.1175" steel plates of varying types (see Table 2) were exposed to a pH=2.8 treatment fluid comprising 1% w/v hydrofluoric acid (generated from ammonium bifluoride in water with pH adjustment), 5% CLA-WEB stabilizing additive (Halliburton Energy Services), 0.5% surfactant, and varying amounts of PMIDA, boric acid and an additional corrosion inhibitor for various times and temperatures (see Table 2).

TABLE 2

| Sample # | Steel Type | Temperature (° F.) | Time (hr) | PMIDA (wt. %) | Additional Corrosion Inhibitor | $HBO_3$ (wt. %) | Corrosion Loss ($lb/ft^2$) |
|---|---|---|---|---|---|---|---|
| 1 | 13Cr | 265 | 16 | 2.5 | 2% HAI-OS | 4 | 0.000165 |
| 2 | F6NM | 265 | 16 | 2.5 | 2% HAI-OS | 4 | 0.000926[1] |
| 3 | X65 | 265 | 16 | 2.5 | 2% HAI-OS | 4 | 0.0043 |
| 4 | F6NM | 265 | 16 | 2.5 | 1% 404M | 4 | 0.00105 |
| 5 | X65 | 265 | 16 | 2.5 | 1% 404M | 4 | 0.3646[2] |
| 6 | X65 | 265 | 16 | 2.5 | 2% HAI-OS + 0.5% 404M | 4 | 0.0246 |
| 7 | F6NM | 265 | 16 | 2.5 | 2% HAI-OS + 0.5% 404M | 4 | 0.00366 |
| 8 | CT | 300 | 3 | 0 | 2.5% MSA-III | 4 | 0.0032 |
| 9 | CT | 300 | 3 | 2.5 | none | 4 | 0.013 |
| 10 | CT | 300 | 3 | 2.5 | none | 0 | 0.065 |
| 11 | Cr—13S | 250 | 6 | 0 | 1% HAI-OS | 4 | 0.0024 |
| 12 | Cf—13S | 250 | 6 | 5.0 | 1% HAI-OS | 0 | 0.1657[2] |

[1]Micropitting observed
[2]Pitting observed

In most instances, the corrosion loss was lower than an industry-acceptable rate of 0.05 $lb/ft^2$ for a period of 6 hours at 265-300° F. In cases where the corrosion loss was unacceptable for a given set of test conditions, the corrosion loss could usually be lowered to an acceptable rate by including boric acid and/or adjusting the additional corrosion inhibitor.

Ionic analyses were conducted by inductively coupled plasma-optical emission spectroscopy (ICP-OES) for the spent fluids of samples 1-7. The ICP-OES data is summarized in Table 3.

TABLE 3

| Sample # | Steel Type | Cr (ppm) | Fe (ppm) | Mn (ppm) | Mo (ppm) | Ni (ppm) | Final pH |
|---|---|---|---|---|---|---|---|
| 1 | 13Cr | 4.58 | 10.1 | 0.85 | 3.71 | 38.72 | 2.77 |
| 2 | F6NM | 5.81 | 46.3 | 0.56 | 2.49 | 6.55 | 2.77 |
| 3 | X65 | 4.17 | 234.1 | 2.88 | 4.03 | 23.11 | 2.79 |
| 4 | F6NM | 6.28 | 61.0 | 0.95 | 3.06 | 33.48 | 2.79 |
| 5 | X65 | 37.69 | 20012 | 216.9 | 6.10 | 17.51 | 4.99 |
| 6 | X65 | 2.29 | 1261 | 14.08 | 2.66 | 26.51 | 2.78 |
| 7 | F6NM | 26.02 | 156.8 | 0.0002 | 4.17 | 22.17 | 2.73 |

The high dissolved iron concentrations in Sample 5 and higher final pH value is consistent with the increased degree of corrosion observed for this sample.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   contacting a steel surface with a corrosive environment, the corrosive environment comprising hydrofluoric acid;
   exposing the steel surface to a corrosion inhibitor composition, the corrosion inhibitor composition comprising an N-(phosphonoalkyl)iminodiacetic acid or any salt thereof; and
   suppressing corrosion of the steel surface by the hydrofluoric acid using the N-(phosphonoalkyl)iminodiacetic acid.

2. The method of claim 1, wherein the corrosion inhibitor composition is present in the corrosive environment when the corrosive environment contacts the steel surface.

3. The method of claim 2, wherein the corrosive environment comprises a treatment fluid and the steel surface is present within a wellbore or is in fluid communication with a wellbore.

4. The method of claim 3, wherein a concentration of hydrofluoric acid in the treatment fluid ranges between about 0.25 M and about 5 M.

5. The method of claim 3, wherein a concentration of the N-(phosphonoalkyl)iminodiacetic acid or any salt thereof in the treatment fluid ranges between about 0.2 M and about 2 M.

6. The method of claim 3, further comprising:
   introducing the treatment fluid into the wellbore;
   contacting the treatment fluid with a siliceous material in a subterranean formation penetrated by the wellbore; and
   at least partially dissolving the siliceous material with the treatment fluid.

7. The method of claim 2, further comprising:
   combining the corrosion inhibitor composition with the corrosive environment before the corrosive environment contacts the steel surface.

8. The method of claim 1, wherein the N-(phosphonoalkyl)iminodiacetic acid has a structure of wherein n is an integer ranging between 1 and about 5.

9. The method of claim 8, wherein the N-(phosphonoalkyl)iminodiacetic acid comprises N-(phosphonomethyl)iminodiacetic acid.

10. The method of claim 1, wherein the corrosion inhibitor composition further comprises an organic corrosion inhibitor.

11. The method of claim 1, wherein the steel surface comprises more than one type of steel alloy.

12. A method comprising:
    providing a treatment fluid comprising:
      hydrofluoric acid or a hydrofluoric acid-generating compound, and
      a corrosion inhibitor composition comprising an N-(phosphonoalkyl)iminodiacetic acid or any salt thereof;
    introducing the treatment fluid into a wellbore penetrating a subterranean formation; contacting the treatment fluid with a steel surface present in the wellbore or in fluid communication with the wellbore; and
    suppressing corrosion of the steel surface by the hydrofluoric acid or the hydrofluoric acid-generating compound using the N-(phosphonoalkyl)iminodiacetic acid.

13. The method of claim 12, wherein a concentration of hydrofluoric acid or generatable hydrofluoric acid in the treatment fluid ranges between about 0.25 M and about 5 M.

14. The method of claim 12, wherein a concentration of the N-(phosphonoalkyl)iminodiacetic acid or any salt thereof in the treatment fluid ranges between about 0.2 M and about 2 M.

15. The method of claim 12, wherein the N-(phosphonoalkyl)iminodiacetic acid has a structure of wherein n is an integer ranging between 1 and about 5.

16. The method of claim 15, wherein the N-(phosphonoalkyl)iminodiacetic acid comprises N-(phosphonomethyl)iminodiacetic acid.

17. The method of claim 12, wherein the corrosion inhibitor composition further comprises an organic corrosion inhibitor.

18. The method of claim 12, further comprising:
contacting the treatment fluid with a siliceous material in the subterranean formation; and at least partially dissolving the siliceous material with the treatment fluid.

19. The method of claim 12, wherein the steel surface comprises more than one type of steel alloy.

20. A method comprising:
providing a steel surface in a wellbore or in fluid communication with a wellbore;
contacting the steel surface with a treatment fluid comprising hydrofluoric acid or a hydrofluoric acid-generating compound and a corrosion inhibitor composition comprising an N-(phosphonoalkyl)iminodiacetic acid or any salt thereof;
wherein a concentration of hydrofluoric acid or generatable hydrofluoric acid in the treatment fluid ranges between about 0.25 M and about 5 M and wherein a concentration of the N-(phosphonoalkyl)iminodiacetic acid or any salt thereof in the treatment fluid ranges between about 0.2 M and about 2 M;
suppressing corrosion of the steel surface by the hydrofluoric acid or the hydrofluoric acid-generating compound using the N-(phosphonoalkyl)iminodiacetic acid; and
maintaining the steel surface in operational use after contacting the treatment fluid with the steel surface.

21. The method of claim 20, wherein the steel surface comprises at least a portion of a subsea riser structure.

22. The method of claim 20, wherein the steel surface comprises more than one type of steel alloy.

* * * * *